July 17, 1928.　　　P. KOROKNAY　　　1,677,141

SIGNAL CONTROL SWITCH

Filed March 23, 1927

Inventor
Paul Koroknay

By Jesse R. Stone

Attorney

Patented July 17, 1928.

1,677,141

UNITED STATES PATENT OFFICE.

PAUL KOROKNAY, OF HOUSTON, TEXAS.

SIGNAL-CONTROL SWITCH.

Application filed March 23, 1927. Serial No. 177,552.

My invention relates to switches for the control of electric signal lights, and particularly to the control of direction signal lights employed upon motor vehicles.

It is the purpose of my invention to provide a signal light upon the rear of a vehicle with legends thereon indicating "Right" and "Left", so that a warning may be given to the drivers of cars in the rear, as to the direction the vehicle is to turn. I contemplate placing upon the steering wheel a switch or switches to be operated by the driver to illuminate the proper signal.

The invention resides in the particular arrangement and construction of the switch and its operating mechanism, the object being to place it in a convenient place for operation by the driver of the vehicle, whereby the switch may be operated by the driver without the necessity of his having to remove his hands from the wheel.

Figure 1:
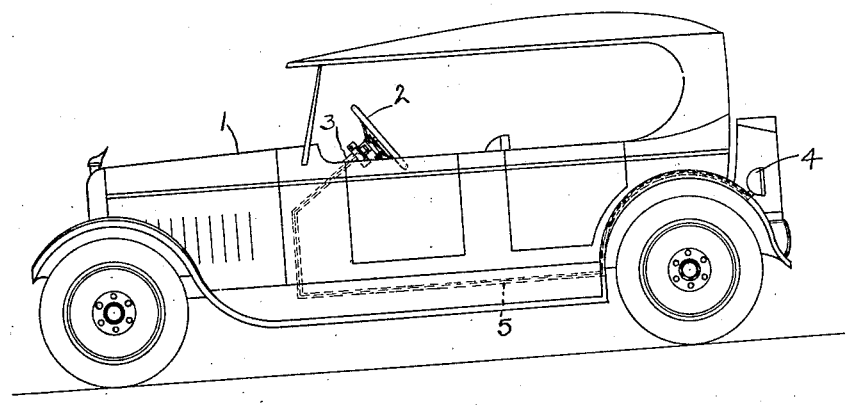
Figure 2:
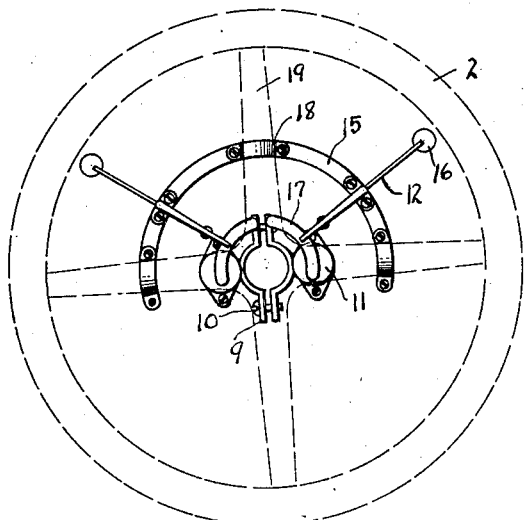
Figure 4:
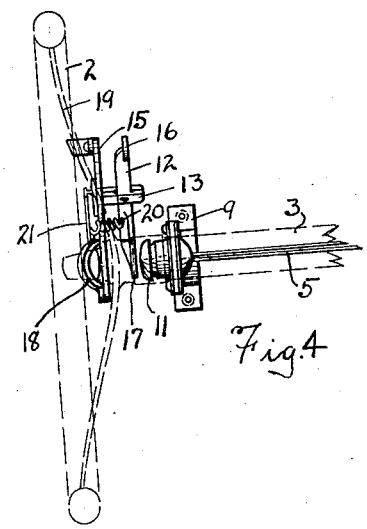
Figure 3:
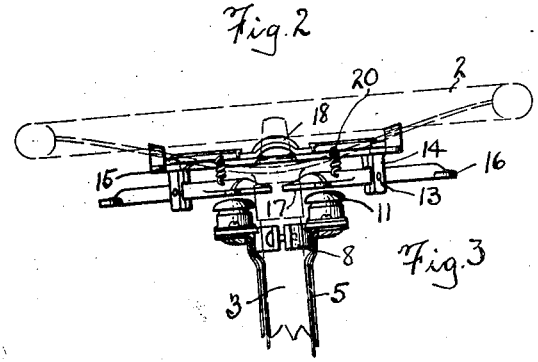
Figure 5:
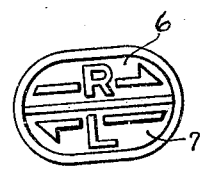

Referring to the drawing for a more complete understanding of the invention, Fig. 1 is a side elevation of a motor vehicle showing the manner in which my invention is applied thereto. Fig. 2 is a top plan view of the switch operating mechanism, the steering wheel being shown in dotted lines. Fig. 3 is a side elevation of the switch mechanism. Fig. 4 is a side elevation thereof taken at right angles to the view shown in Fig. 3, all but the switch mechanism being shown in dotted lines; and Fig. 5 is a view illustrating the lens of the signal lantern which may be employed, if desired.

In Fig. 1 is shown a type of motor vehicle 1, having thereon a steering wheel 2 mounted upon a steering post 3. A signal lantern 4 is shown at the rear end of the car and dotted connections, shown at 5, indicate the position of the electrical circuit wires leading from the steering post to the lantern, it being understood that a source of electricity, such as a battery, is connected in this circuit 5.

The signal lantern is understood as being divided into two chambers—an upper chamber 6 having the letter R thereon, indicating a turn to the right, and a lower chamber 7 having the letter L thereon, which illuminated indicates a turn of the vehicle to the left. The lights in these two chambers are connected through wires 5 to the switches upon the steering post. I employ a bracket 8 comprising two arcuate plates adapted to fit about the steering post and having radial arms 9 thereon through which a clamping screw 10 may extend. The bracket is thus detachably secured to the steering post at the proper level relative to the steering wheel.

On each of the two plates constituting the bracket is mounted a switch of the button type, and it may be understood that this switch is common in the art and its construction need not be particularly described. The wires 5 are connected to a post and to a button 11 held resiliently away from the post and adapted to be depressed against the action of the spring to close the structure. As shown in Fig. 2, these two switches operating the two lights in the lantern are arranged on opposite sides of the steering post.

To depress the buttons when occasion requires, I have provided operating levers 12 for this purpose. Said levers are pivoted at 13 between their ends upon lugs 14 extending downwardly from an arcuate plate 15 supported upon the steering wheel. The outer end of the lever has a handle 16 thereon positioned at a point adjacent the rim of the wheel and within the easy reach of the fingers of the operator while the wheel is being gripped.

The inner arm of the lever is formed into an arcuate head 17. Said head is shaped on the arc of a circle having the axis of the steering post as a center. The head is so placed relative to the button 11 beneath it that when the steering wheel is in normal position with the car driving straight ahead, the lower end of the head will be immediately over the button, the upper portion extending beyond the button so that when the head is depressed into contact with the button, the wheel may be rotated in the direction indicated by the lantern without releasing the button until the wheel has been rotated to about 90°. The head is held normally away from the switch button by means of a spring 20, secured to an arm 21 upon the frame and to the lower side of the lever arm adjacent the head 18. The head may, however, be depressed against the tension of the spring and the spring will tend to withdraw the head when the handle is released.

The plate 15, upon which the levers are mounted, may be formed integrally with the wheel, if desired, but I have shown it detachably secured thereto by means of plates 18, fitting about the spokes 19 of the wheel and secured to the body of the plate 15 by screws or other similar means. As will be seen from Fig. 2, the plate 15 is semi-circular in shape and supports the two levers 12 in a position extending radially from the steering post and in positions at about right angles to each other. It is desired that the two levers be arranged in the position approximately as shown in Fig. 2.

In the operation of this device, the operator will be enabled to illuminate the proper signal, indicating the direction in which he is to turn, by controlling the lever and depressing the switch energizing the proper circuit. As will be seen from Fig. 3, the driver may easily move the fingers of either hand into contact with the adjacent handle of the lever. If he has to turn in a right-hand direction, he will operate the proper lever 12 by the fingers of his right hand depressing the button and illuminating the proper signal before he startes to turn. This will warn drivers of vehicles behind him of the direction he is about to turn. The lever may be continually depressed until the vehicle has partly turned to go around the corner in the direction indicated and then the lever may be released before it has entirely moved free of the switch button 11 beneath.

It will be obvious that the proper signal may be easily illuminated by the operator without the necessity of removing his hands from the wheel or looking in a direction of the switch, the handle of the switch always being in a position adjacent the hands of the driver.

The advantages of this construction will be apparent without further description.

What I claim as new and desire to protect by Letters Patent is:

1. A switch attachment for steering wheels including a bracket below said steering wheel, opposite button switches on said bracket controlling the circuit of a lantern, an arcuate frame on said steering wheel, radially extending levers pivotally supported on said frame, handles on said levers adjacent the rim of said steering wheel, and arcuate extensions on said levers adapted to slidably contact with said button switches when said handles are depressed.

2. A signal lantern switch for attachment to steering posts of vehicles adjacent the steering wheel thereon, comprising a button switch supported adjacent said wheel, a lever pivoted between its ends upon said wheel, a handle on said lever projecting outwardly, and an arcuate head on said lever adjacent said button switch and adapted to move into contact with the same when said handle is depressed.

3. A switch attachment for steering wheels including a bracket adjacent said steering wheel, a plurality of switches upon said bracket, levers pivoted upon said steering wheel, handles on said levers adjacent the rim of said steering wheel, and arcuate heads on said levers positioned to engage said switches in various rotative positions of said wheel when said heads are depressed.

In testimony whereof I hereunto affix my signature this 18 day of March, A. D. 1927.

PAUL KOROKNAY.